US008766491B2

(12) United States Patent
Fleck

(10) Patent No.: US 8,766,491 B2
(45) Date of Patent: Jul. 1, 2014

(54) LOAD CONTROL APPARATUS WITH PEAK REDUCTION IN AGGREGATE BEHAVIOR

(75) Inventor: Christopher K. Fleck, St. Louis, MO (US)

(73) Assignee: Aclara Technologies LLC, St. Louis, MO (US)

( * ) Notice: Subject to any disclaimer, the term of this patent is extended or adjusted under 35 U.S.C. 154(b) by 502 days.

(21) Appl. No.: 13/233,173

(22) Filed: Sep. 15, 2011

(65) Prior Publication Data

US 2012/0074780 A1 Mar. 29, 2012

Related U.S. Application Data

(60) Provisional application No. 61/386,720, filed on Sep. 27, 2010.

(51) Int. Cl.
H01H 9/54 (2006.01)
(52) U.S. Cl.
USPC .......................................................... 307/140
(58) Field of Classification Search
USPC .......................................................... 307/140
See application file for complete search history.

(56) References Cited

U.S. PATENT DOCUMENTS

| | | | |
|---|---|---|---|
| 4,324,987 A | 4/1982 | Sullivan, II et al. | |
| 5,786,757 A | 7/1998 | Right et al. | |
| 6,419,454 B1 | 7/2002 | Christiansen | |
| 6,965,319 B1 | 11/2005 | Crichlow | |
| 7,010,363 B2 | 3/2006 | Donnelly et al. | |
| 7,149,605 B2 | 12/2006 | Chassin et al. | |
| 7,242,114 B1 | 7/2007 | Cannon et al. | |
| 7,430,459 B1 | 9/2008 | Papalia et al. | |
| 8,010,240 B2 | 8/2011 | Mattiocco et al. | |
| 2008/0147885 A1 | 6/2008 | Bessis | |
| 2008/0157938 A1 | 7/2008 | Sutardja | |
| 2008/0177678 A1 | 7/2008 | Di Martini et al. | |
| 2010/0070103 A1 | 3/2010 | Fleck et al. | |
| 2010/0076835 A1 | 3/2010 | Silverman | |
| 2011/0173109 A1* | 7/2011 | Synesiou et al. ................. 705/34 |

OTHER PUBLICATIONS

International Search Report dated Jan. 17, 2012 relating to International Application No. PCT/US2011/051915, 3 pages.

* cited by examiner

Primary Examiner — Robert L. Deberadinis
(74) Attorney, Agent, or Firm — Senniger Powers LLP

(57) ABSTRACT

When load control is activated by a local or remote mechanism to control a load, the method and system use a usage profile of the load and one or more of (1) interval start times, (2) ON/OFF or OFF/ON cycling and (3) predefined periods during which load must not be allowed to run (e.g., dead zones) to determine when a particular piece of equipment is allowed to shed or run thereby reducing the probability of occurrence of cyclical and non-cyclical aggregate peaking of usage wherein cyclical peaking is manifested as an artifact of the local load control rules during a load control event.

20 Claims, 13 Drawing Sheets

LOAD CONTROL APPARATUS WITH PEAK REDUCTION IN AGGREGATE BEHAVIOR

BACKGROUND OF THE INVENTION

Electrical utilities must continually manage their capacity to ensure that the amount of electricity generated by the utility, or purchased from other utilities, is sufficient to meet the load demand placed on the system by their customers. Utilities generally have two options for meeting demands on the system during periods of peak energy demand (loading). These include either bringing additional generating capacity on-line to satisfy the increased demand; or, if properly equipped, load control (LC) to selectively shed load across their customer base to reduce overall demand on the system.

Demand response thus refers to the reduction of a customer's energy usage at times of peak demand. It is done for a variety of reasons including system reliability (the avoidance of "blackouts" or "brownouts"), market conditions and pricing (preventing the utility from having to buy additional energy on the open-market at premium prices), and supporting infrastructure optimization or deferral. Demand response programs include dynamic pricing/tariffs, price-responsive demand bidding, contractually obligated and voluntary curtailment of energy usage, and direct load control/cycling.

There is a trend in the electric utility industry, with respect to performing load control (LC) on appliances, that the LC should be based on the individual appliance loading characteristics. Indeed this provides more equitable load shedding for a given consumer and a finer resolution of control based on the end consumer's profiled load. When performing LC in this fashion the LC algorithms are based on individual local information which provides some variability with respect to the aggregate loading that the utility observes. Developing these LC devices to perform their functions based on local information is attractive because it can reduce the burden on the utility with respect to formation and execution of an LC event. They no longer have to perform detailed modeling or analysis prior to LC execution to achieve their desired goals. They may simply specify a certain level of load they wish to dispatch and each device targeted by that LC event will dispatch that percentage of its load thus contributing to the aggregate load reduction. However, when specifying local rules or behaviors for cycling a load, new behaviors can emerge at a global level. These emergent behaviors may be benign, positive or negative. One such emergent behavior that has a negative impact on the utility is termed "false peaking".

False peaking is when a significant enough portion of a population of loads, currently under an LC event, allow load to run at the same moment in time such that the demand, as seen by the utility, raises to an undesirable level. Sometimes this false peak may be as bad as or worse than the original anticipated peak demand that the LC event sought to eliminate. In global based LC patterns where every LC device is executing a pattern imposed on them regardless of the local behavior of the load, false peaking is not a threat as the utility will construct the cycling behavior to ensure that a certain percentage of the loads are always off. When allowing each individual LC device to determine its own cycling pattern independent of the other devices, there is no global guarantee that at a given time all the loads will not happen to cycle on. A certain amount of variability within the characteristics of the load, the LC device settings, etc. will help to reduce the likelihood of false peaking in a passive fashion, but that does not actively set out to reduce false peak occurrences.

To better understand the role that local rule based LC using local information has on false peaking, one must first understand how the local load information is generally structured and how it relates to the cycling of a load during a LC event.

Generally, the load to be controlled is characterized based on its usage patterns or habits. This load characterization is also known as a usage profile. Typically the profiles will be discretized such that the desirable level of usage resolution is achieved while minimizing data storage requirements. This resolution is typically granular enough that the usage profile provides an accurate representation of the load over a small period of time. However, during a LC event the load will be cycled over a period of time generally much larger than the resolution of the accumulated usage profile. Therefore the formation of even a single LC cycle (opening and closing a relay, or simply ON and OFF) likely uses data from multiple elements of the profile. Therefore in order to compute how the load must cycle, there is generally an aggregation step that involves the grouping of the usage profile elements into periods of time suitable for computing a cycling pattern. Also note that over a given LC event, there may be multiple periods of time in which different cycling patterns are computed. This allows a single event to contain cycling patterns that vary over time to better match the typical usage behavior of the load.

This invention relates to load control of pieces of equipment connected to an electrical distribution system. More particularly, the invention includes an apparatus and method of performing load control of the pieces of equipment based on load characterizations of the pieces of equipment. The apparatus and method employ cyclical and non-cyclical peak reduction in the aggregate behavior of a plurality of pieces of equipment. Cyclical peaks tend to be driven primarily from the way load control is done on cyclical boundaries (intervals) as compared to non-cyclical peaks which are also a concern and occur independent of the cyclical nature of the load control algorithms being implemented.

SUMMARY OF THE INVENTION

Embodiments of the invention provide methods and apparatus to actively reduce and in some scenarios eliminate the likelihood of both a cyclical false peak and a non-cyclical false peak from occurring.

According to an embodiment of the invention, when load control is performed either by direction (remotely or locally), or autonomously, in a load control unit (LCU) (also referred to herein as a device) installed at a given location, the method and system use a usage profile of the load and one or more of (1) subinterval grouping, (2) ON/OFF or OFF/ON cycling order and/or (3) predefined periods during which load must not be allowed to run (e.g., dead zones) to determine when a particular piece of equipment is allowed to shed or run.

According to an embodiment of the invention, the LCUs employed with the methods and devices of the invention tend to optimize load shedding with respect to maintaining consistent system loading and tend to minimize or eliminate the occurrence of cyclical and non-cyclical false peaks. Doing so enhances the reliability of the load control operation with respect to the electrical distribution system to produce an outcome with less false peaks and in general smoother loading curves during the load control event.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

The present invention is a system and/or method for remotely controlling individual loads of an electrical distribution system in such a way that an aggregate behavior of reducing and in some scenarios eliminating cyclical and non-cyclical false peaks is achieved. When load control is activated by a local or remote mechanism to control a plurality of loads, the method and system use, in addition to the prescribed load control parameters and settings, a usage profile of the load and one or more of (1) modified interval start time, (2) ON/OFF versus OFF/ON cycling and (3) one or more predefined periods of time during which load must not be allowed to run (e.g., dead zones) to determine when a particular piece of equipment is allowed to shed or run.

Figure 1:
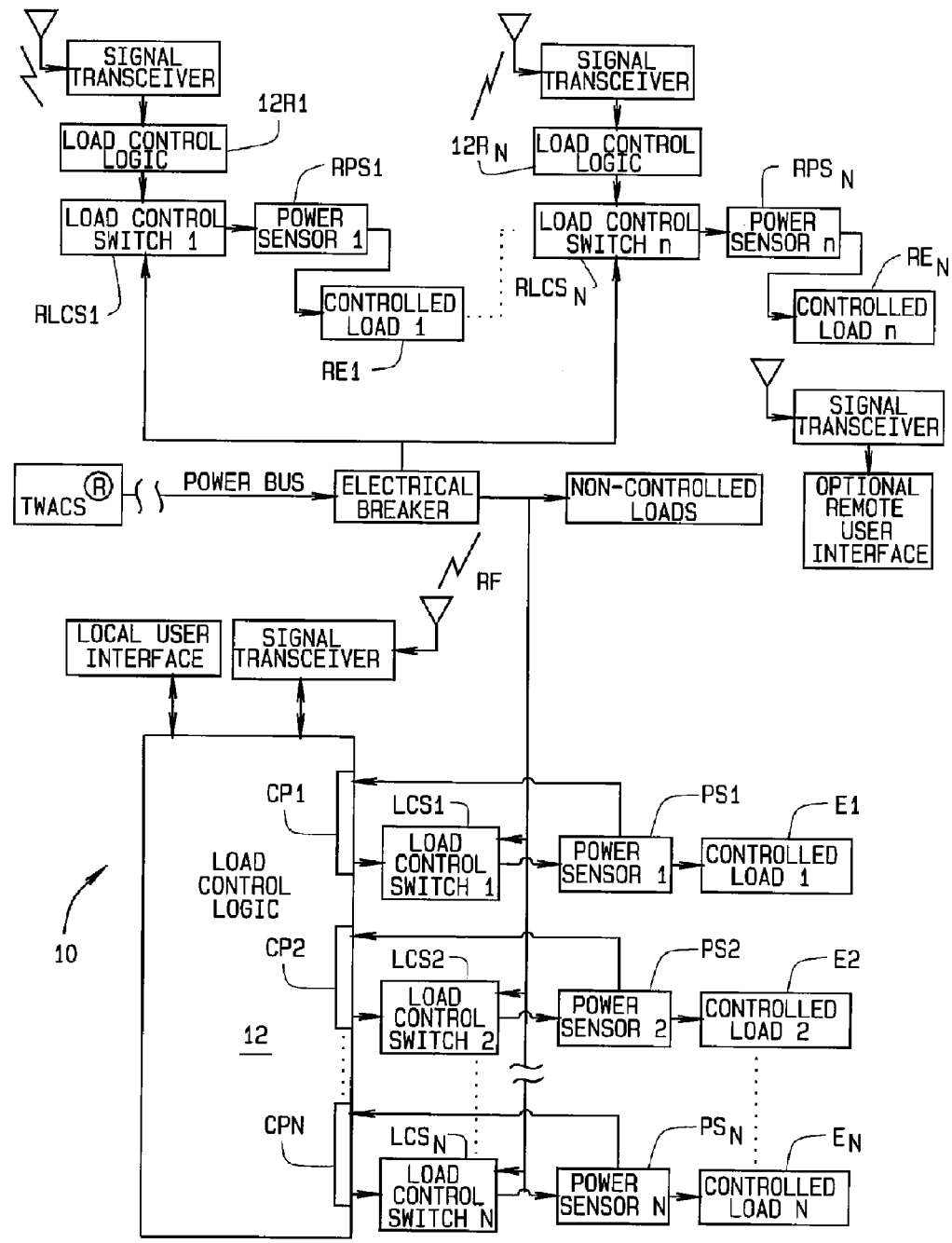
FIG. 1 is a block diagram of an installation of the load control system of the present invention.
Figure 2:
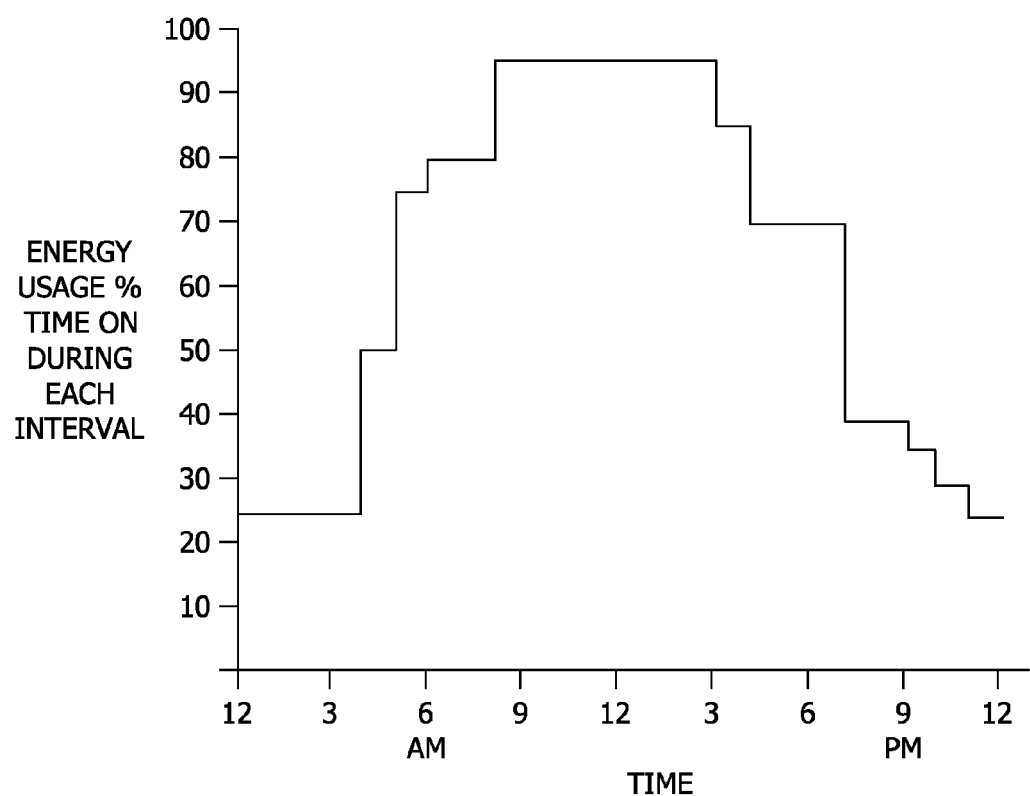
FIG. 2 is an exemplary usage profile for a load controlled piece of equipment.

System and Profile Overview (FIGS. 1-2)

In the scope of this discussion let a subinterval represent the base period of time over which a load is characterized. Further, let an interval represent the base amount of time over which a single cycle pattern is computed. Using this terminology, a single LC event likely contains multiple intervals which in effect are independent applications of the local rules using the aggregated data collected from the subintervals that comprise the given interval. The impact this has on false peaking is first, the inherent variability of the usage profiles (one consumer to the next) is somewhat lost in the aggregation process resulting in a higher probability that the various device cycle patterns will be similar when the local rules are applied and second; the potential occurrence of some false peaks are cyclical in nature in that the conditions that could cause the false peak to occur in a single application of the local rules is now repeated for every interval.

By way of example, consider a load usage profile collecting usage data in subintervals of 5 minutes each and performing LC based on 30 minute intervals. An LC event occurs and the relevant subintervals are aggregated into the LC intervals. The LC rules are then applied to each interval to produce cycling patterns for the relay that controls the load, where each pattern is applied consecutively. Independent of the LC rules used, the cycling pattern at the start of every interval will indicate to either shed load or allow load. Without loss of generality, assume that at the start of every interval the load is allowed to run for a given amount of time prior to being cycled off as the pattern is followed. At a global level, at each interval boundary, for all the devices that had some allowance for load to run in that interval, those devices will allow load to run. This is a window of opportunity for false peaking to occur because the emergent global behavior of a simple local rule (order of relay cycling: cycle ON the OFF) is that every interval start time allows all loads to run according to their usage profiles. This window of opportunity is then repeated every 30 minutes when a new interval begins.

Referring to FIG. 1, a load control unit or LCU generally indicated 10 is installed at a customer's site. The LCU is attached either directly to each piece of locally controlled equipment E (indicated E1-En), or wirelessly (e.g. via RF or IR) to each remotely controlled piece of equipment RE (indicated RE1-REn), at that location that is to be load controlled. Once all necessary connections are made, the LCU is powered and normal operation begins. At any point in time; prior, during or after installation or normal operation, the device may be configured according to specific characteristics of the attached loads. The LCU is programmed with an algorithm by which it affects the shedding of load when a load control event subsequently occurs.

A load control logic unit 12 of LCU 10 (which may alternatively be a processor or the combination of a logic unit and processor) monitors, records, and updates usage profiles of the pieces of equipment, whether these pieces are connected directly or wirelessly to the LCU. The LCU includes a plurality of control ports CP1-CPn through which equipment is directly connected to the LCU; as well as a plurality of remote control ports for the remotely located equipment RE1-REn. Load control commands promulgated by LCU 10 are supplied to a load control switch LCS1-LCSn for the respective pieces of equipment being directly controlled.

For the remotely located equipment, control switches RLS1-RLSn, sensing circuitry RPS1-RPSn, and load control logic units 12R1-12Rn are located in proximity to the equipment so that a wireless link may, for example, be provided by LCU 10. Embodiments of the invention are implemented by the LCU 10 upon receipt of a load control event. It should also be noted that in certain embodiments, LCU 10, in effect, acts as a modem passing commands to the remote load control logic units 12R1-12Rn. The respective remote units then individually determine how to control (shed) the load to which each unit is connected. In one embodiment of the invention, LCU 10 receives a command to shed X % of the load connected to it (either directly or wirelessly). The LCU then ranks the respective loads controlled by the various load control logic units, determines how to distribute the X % among them and sends appropriate commands to the various units. Regardless of the control strategy employed, the setup shown in FIG. 1 provides a great amount of flexibility for the LCU and enhances its ability to control a wider range (both in regards to type of, and distance from the LCU) of equipment. Operationally, the pieces of remote equipment RE are profiled by the load control logic units of the LCU 10 in proximity to them. Each load control logic unit then stores the usage profile for its associated piece of equipment and controls the shedding of load by the piece of equipment during a load control event, as further described hereinafter.

Over time, the load control logic units 12 profile energy usage of each piece of controlled equipment E or RE. The resulting profiles subsequently allow each piece of equipment E1-En and RE1-REn to be individually controlled in a manner unique to that particular piece of equipment. This is advantageous in that, for example, during a load control event, it allows an air conditioner to be operated in a way tailored to its normal operating cycle; while a water heater or pool pump is operated in a different manner in accordance with their normal operating cycles.

FIG. 2 is a representative profile in which the subinterval is one hour (1 hr.) and encompasses a twenty-four hour period from midnight to midnight. In FIG. 2, the graph indicates how long the piece of equipment is "on" during each hour. As shown in FIG. 2, the piece of equipment is typically shut-off or on standby power during the early morning period. As the morning progresses, the equipment is more in use, but its peak usage occurs between mid-morning and mid-afternoon. Thereafter, as the afternoon progresses into evening, the piece of equipment is used less and its usage level returns back to its midnight starting level. Those skilled in the art will recognize that the usage profile may be any collection of data that characterizes the behavior of the load over some time period.

Once an energy usage profile has been established, LCU 10 controls power flowing to the equipment using direct and/or autonomous load control commands. In general, both direct and autonomous commands may include features or logic to minimize or prevent short cycling. A direct load control command is issued in a number of ways. For example, it can be remotely sent to LCU 10 from the utility using a communications link such as a two-way-automatic communications system or TWACS®, or by RF communications. It can also be issued locally using a personal computer (PC), or a handheld device. Local communications may be wired or wireless.

Autonomous load control commands are self generated by LCU 10 which is programmed with a set of instructions or rules according to which load control commands are issued. For example, LCU 10 will monitor its own input power (voltage and frequency) and based upon variations in these, typically an under-voltage or under-frequency condition which persists for longer than a predetermined time period, decide to protect the customer's equipment and the utility from a potential brown out condition, by issuing a load control command. At any given time, the operational state of LCU 10 can be displayed to a local user via a directly connected user interface or via a remote interface.

Once a particular load control command is accepted, LCU 10 determines when to switch-in or switch-out power to the controlled equipment. The decision is made by evaluating each piece of equipment's usage profile in light of the control command parameters, the piece of equipment's constraints and current behavior, and/or the local rules known by the device and/or other aspects.

Once the event is over, the opportunity for false peaking is over as any peaking that occurs in periods of non-load control is considered regular peaking demand and not an artifact of the application of an LC event.

Figure 3:
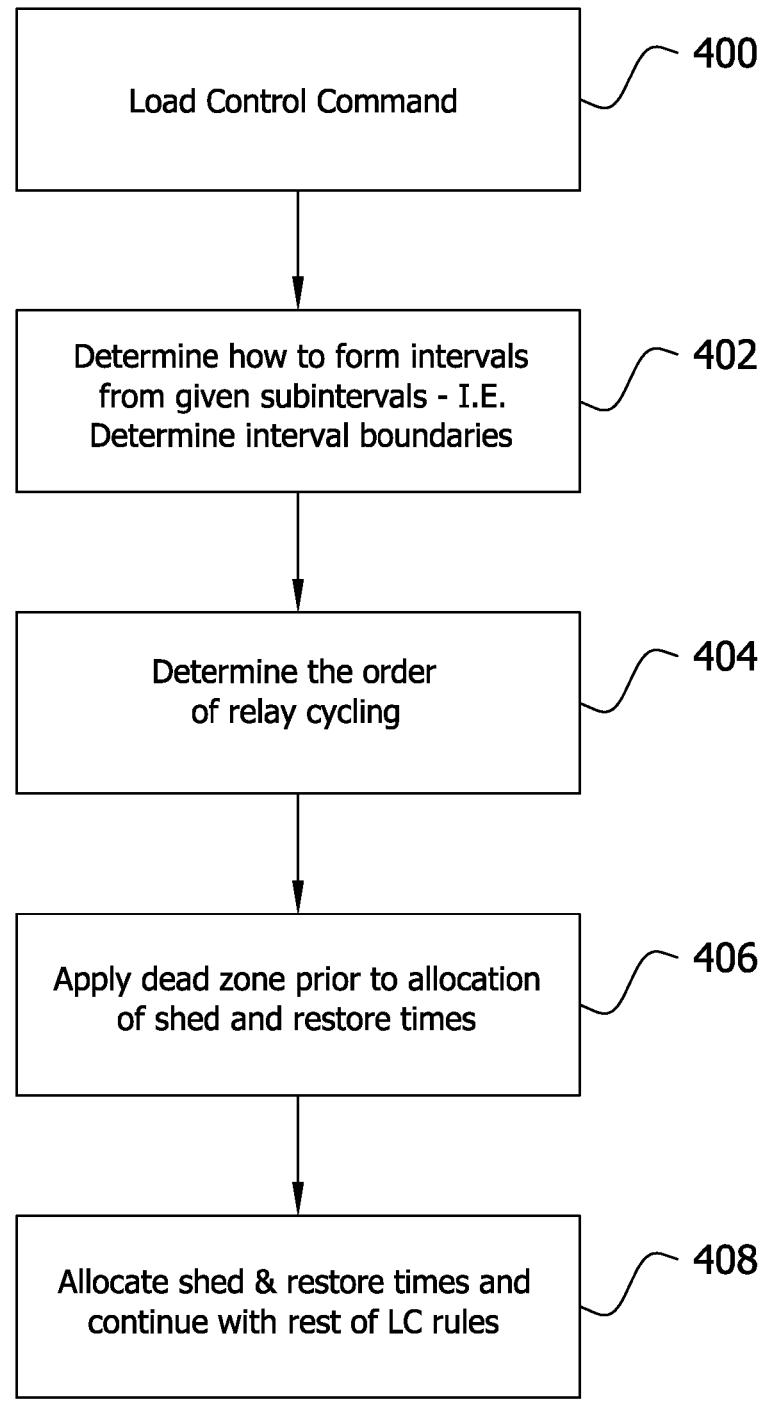
FIG. 3 is a flow diagram illustrating one embodiment of the operation of the load control devices and method of FIG. 1.

Adaptive Load Control Algorithm (FIG. 3)

If we assume during a load control event that every load will attempt to run the full amount of time it is allowed and if we assume that every device's usage profile allows some amount of load to be run during every interval, then at the start of every interval 100% of the loads will be ON for a given amount of time. In practice, the variability between the individual loads and their behaviors will tend to reduce the likelihood of this cyclical false peak from occurring. It is the intent of the embodiments of the invention to further reduce and in some scenarios eliminate the likelihood of false peaks by configuration of each load control device rather than by depending only on the variation of the individual loads.

FIG. 3 is a flow diagram illustrating one embodiment of the operation of the load control devices and method of FIG. 1. After a command to control load is received or autonomously generated at 400 and prior to each device applying its local load control rules which determine if and/or when to cycle the attached load, each device must form its load control intervals at 402. The intervals are formed by determining which usage profile subintervals are summed together thereby defining the interval boundaries. In one embodiment, the intervals are formed by selecting which subintervals comprise a given interval based on some locally known information which allows some diversity at the global level. This diversity may be deterministic or random. In one embodiment, the diversification may be based on a reference such as the serial number of the device (e.g., for four subintervals, numbers divisible by four would begin their interval with the first subinterval; numbers divisible by four with one remainder would begin their interval with the second subinterval; numbers divisible by four with two remainder would begin their interval with the third subinterval; numbers divisible by four with three remainder would begin their interval with the fourth subinterval). The reference may also be a number designated at the time of manufacture or a number provided by the transceiver. In one embodiment, the interval boundaries are varied by varying the initial subinterval which marks the beginning of each interval. The first interval boundary is where the load control actually starts and the first interval then ends at the next subinterval boundary that marks the next full interval. The very first interval for a device will begin at the moment in time that the load control event begins and will continue until the next interval boundary which is chosen as noted above, depending on the embodiment.

Alternatively or in addition to forming the interval boundaries differently over the population of devices, each device may vary the load control cycling pattern behavior (i.e. the order of cycling the load ON/OFF or OFF/ON) at 404 based on some locally known information which allows some diversity at the global level. This diversity may be deterministic or random. In one embodiment, the cycling pattern may be based on a reference such as the serial number of the device (e.g., an odd number begins at ON and an even number begins at OFF). Alternatively, the reference may be a number designated at the time of manufacture or a number provided by the transceiver. This reference may be different than the reference for forming the load control interval boundaries.

Alternatively or in addition to forming the interval boundaries at 402 and/or the load control cycle pattern behavior at 404, the likelihood of false peaking may be reduced by each device including at 406 a dead zone during which the load does not operate. The dead zone may be a subinterval or any other selected period of time. In one embodiment, the location in time of a dead zone of a device may be based on a reference such as the serial number of the device (e.g., for five subintervals, numbers divisible by five would have their dead zone at the first subinterval; numbers divisible by five with one remainder would have their dead zone at the second subinterval; numbers divisible by five with two remainder would have their dead zone at the third subinterval; numbers divisible by five with remainder three would have their dead zone at the fourth subinterval; numbers divisible by five with remainder four would have their dead zone at the fifth subinterval).

Figure 4:
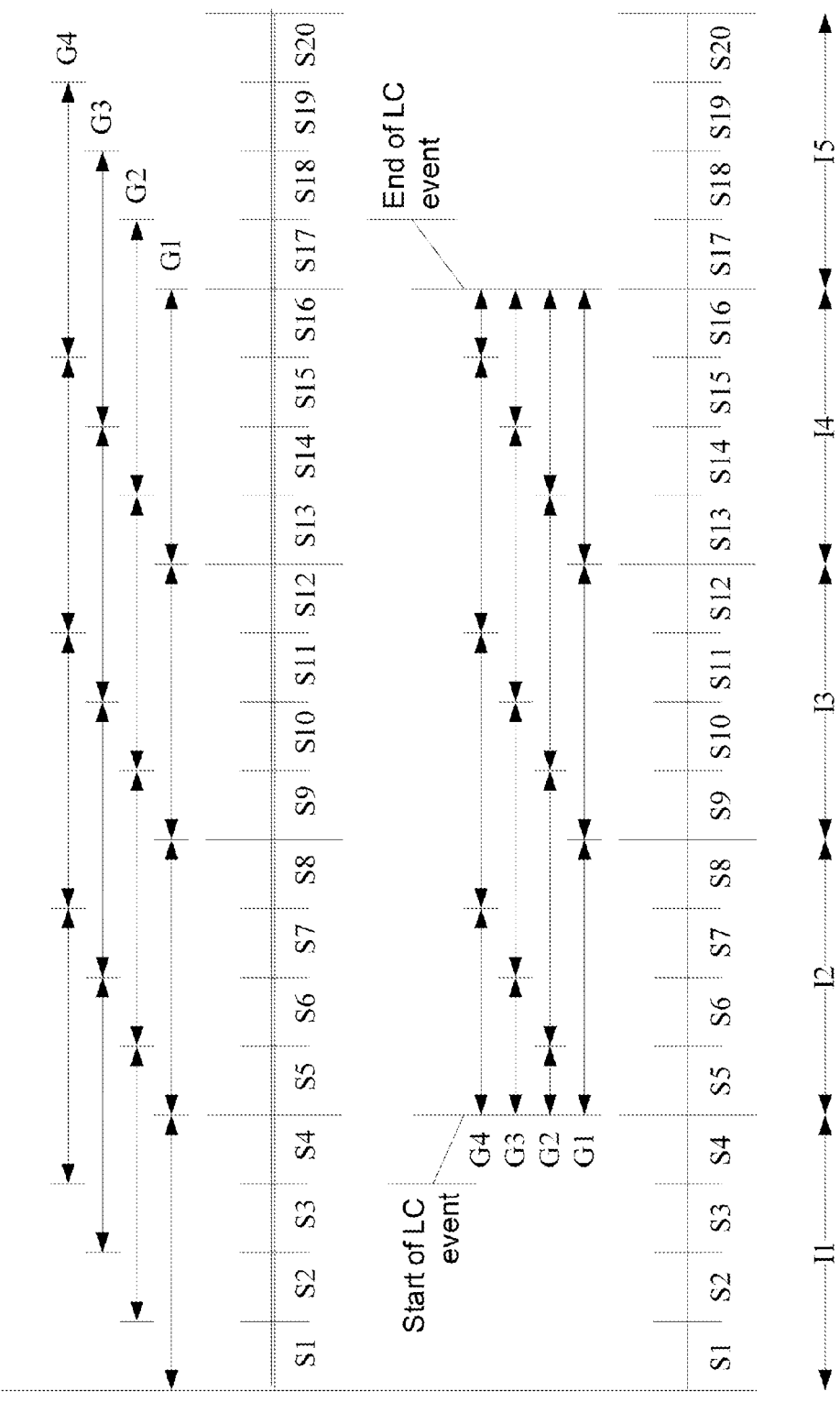
FIG. 4 is a timing diagram illustrating the aggregation of subinterval profile data into interval control periods for four different groups of pieces of equipment (G1-G4) in which the interval boundaries are varied by varying the initial subinterval which begins each load control interval.
Figure 7:
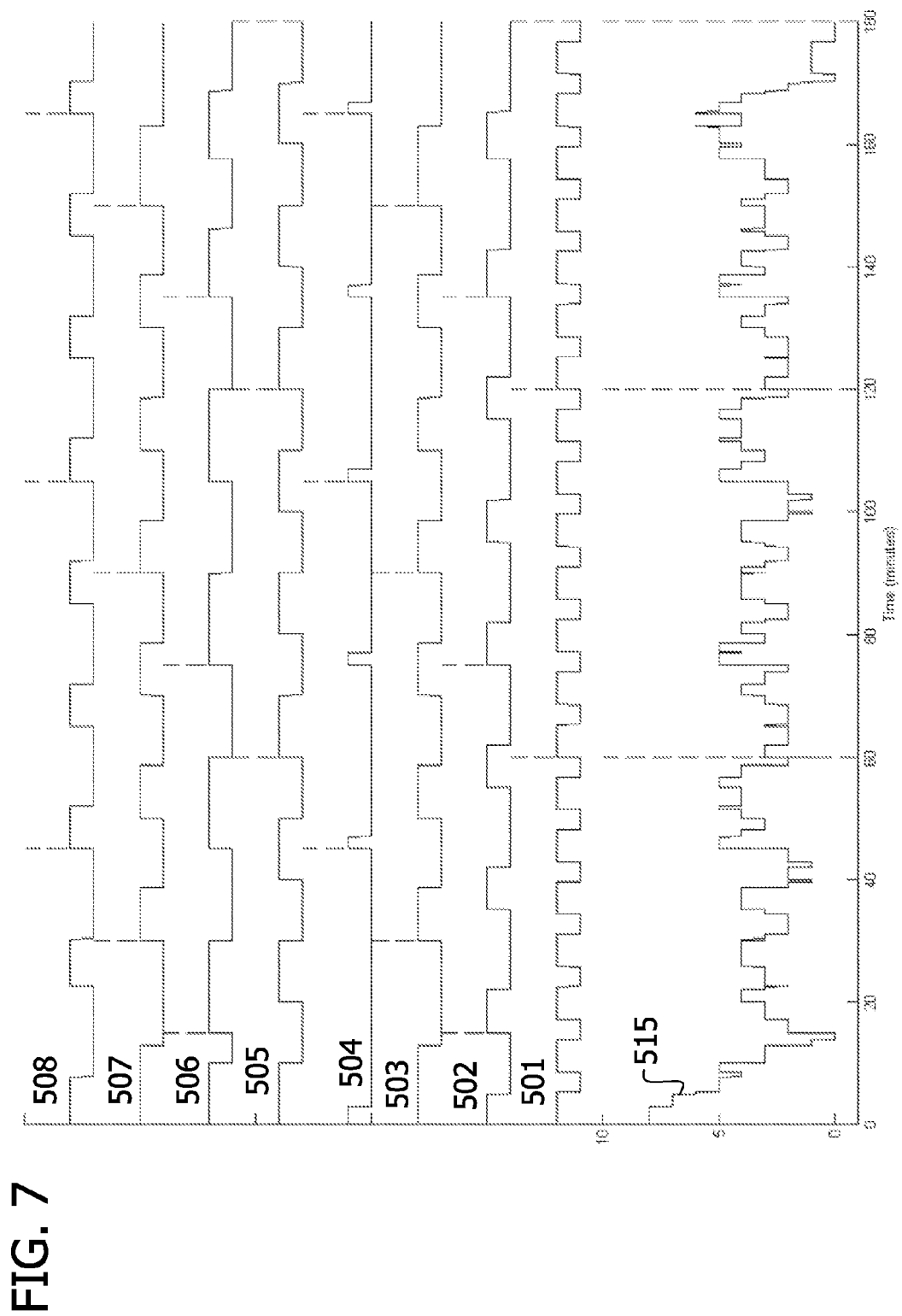
FIG. 7 is a waveform diagram of the eight interval cycle patterns of FIG. 6 in which some have been revised to have different interval start times (i.e., different subinterval shifts) and showing the false peak windows of opportunity in the revised aggregate pattern with time along the x-axis and number of loads operating (i.e., ON) along the y-axis.
Figure 8:
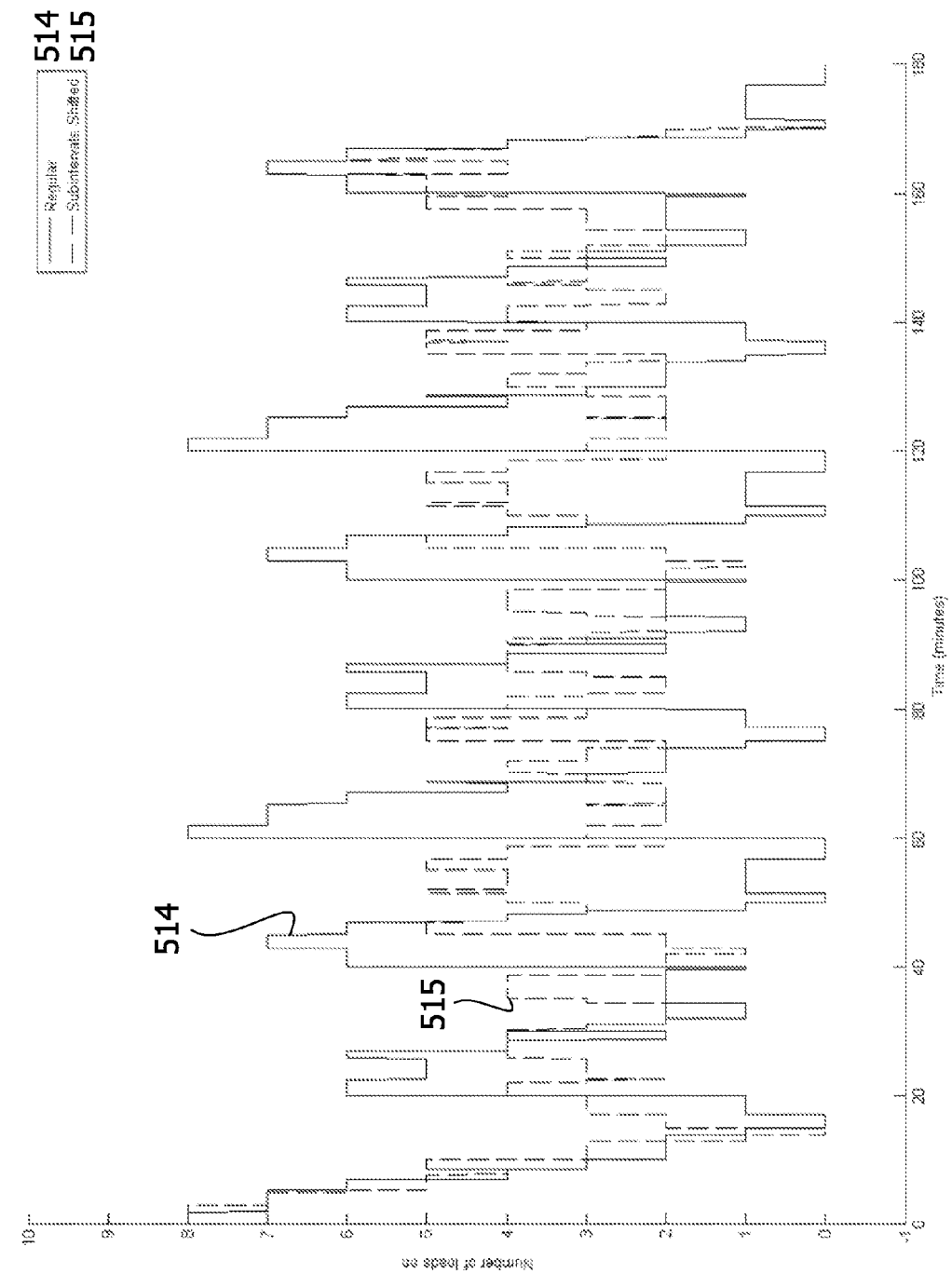
FIG. 8 is an overlay comparison of the aggregate interval cycle pattern of FIG. 6 and the revised aggregate pattern of FIG. 7 showing the reduction in the false peaks with time along the x-axis and number of loads operating (i.e., ON) along the y-axis.

Subinterval grouping; varying interval start (FIG. 4; FIGS. 7 and 8)

In order to reduce the occurrence of the cyclical false peaks, the devices of the invention in one embodiment can be organized into a number of two (2) or more groups. As an example, four (4) groups G1, G2, G3, and G4 of devices are illustrated in FIG. 4. Each group of devices is configured to form its intervals by summing its usage profile subintervals using the different subintervals as noted at 402 of FIG. 3. As shown in FIG. 4 for illustration only, assume each interval I1, I2, I3, I4 and I5 begins on the hour and has four subintervals. Interval I1 includes S1, S2, S3 and S4; interval I2 includes S5, S6, S7, and S8; interval I3 includes S9, S10, 511, and S12; interval I4 includes S13, S14, S15, and S16; and interval I5 includes S17, S18, S19, and 520.

Group G1 would form its intervals beginning with the subintervals S1, S5, S9, S13, and S17, to define the starting interval boundaries, e.g., at the beginning of each hour, so that its usage profile would be referenced to the beginning of these subintervals.

Group G2 would form its intervals beginning with the subintervals S2, S6, S10, S14 and S18, to define the starting interval boundaries, e.g., at 15 minutes after each hour, so that its usage profile would be referenced to the beginning of these subintervals.

Group G3 would form its subintervals beginning with the subintervals S3, S7, S11, S15 and S19, to define the starting interval boundaries, e.g., at 30 minutes after each hour, so that its usage profile would be referenced to the beginning of these subintervals.

Group G4 would form its intervals beginning with the subintervals S4, S8, S12, S16 and S20, to define the starting interval boundaries, e.g., at 45 minutes after each hour, so that its usage profile would be referenced to the beginning of these subintervals.

The load control event illustrated in FIG. 4 begins at interval I2 and ends with interval I4. In one embodiment, the first interval boundary is where the load control actually starts and the first interval then ends at the next subinterval boundary that marks the next full interval. During this load control event, each device in group G1, depending on the usage profile of its load, is permitted to begin to run its load for its respective intervals at the start of S5, S9 and S13. Similarly, during this load control event, each device in group G2, depending on the usage profile of its load, is permitted to begin to run its load for its respective intervals at the start of S5, S6, S10 and S14. Similarly, during this load control event, each device in group G3, depending on the usage profile of its load, is permitted to begin to run its load for its respective intervals at the start of S5, S7, S11 and S15. Similarly, during this load control event, each device in group G4, depending on the usage profile of its load, is permitted begin to run its load for its respective intervals at the start of S5, S8, S12 and S16.

Thus, the groupings provide the following result given that the loads will run at the start of each interval if the usage profile is such that there is load to be run (i.e. there is dispatchable load available). The first interval for all groups (G1 through G4) starts at S5, thus all devices will begin to allow load to run if there is available dispatchable load. In many scenarios about 25% of the devices (i.e., the devices in G1) would begin to run their load at the beginning of their subsequent interval boundaries (i.e., at subintervals S9 and S13), during the load control event. Similarly, in many scenarios about 25% of the devices (i.e., the devices in G2) would begin to run their load at the beginning of their subsequent interval boundaries (i.e., at subintervals S6, S10 and S14). Similarly, in many scenarios about 25% of the devices (i.e., the devices in G3) would begin to run their load at the beginning of their subsequent interval boundaries (i.e., at subintervals S7, S11 and S15). Similarly, in many scenarios about 25% of the devices (i.e., the devices in G4) would begin to run their load at the beginning of their subsequent interval boundaries (i.e., at subintervals S8, S12 and S16). It is also contemplated that the start and/or end time of the event does not necessarily have to line up with a subinterval boundary so that the very first interval starts not on a boundary nor does the last interval necessarily have to end on a boundary.

Note that configuring a particular group (e.g., Group 1) to reference its usage profile at a particular time (e.g., the beginning of the interval) does not preclude the devices in the other groups from allowing their load to run during this particular time. However, this configuration of groups prevents the possibility of more than 25% of the devices starting simultaneously at the beginning of an interval by virtue of the interval boundary where it is known the loads are guaranteed to run if able to do so, thus reducing the probability of a cyclical false peak occurring.

Figure 6:
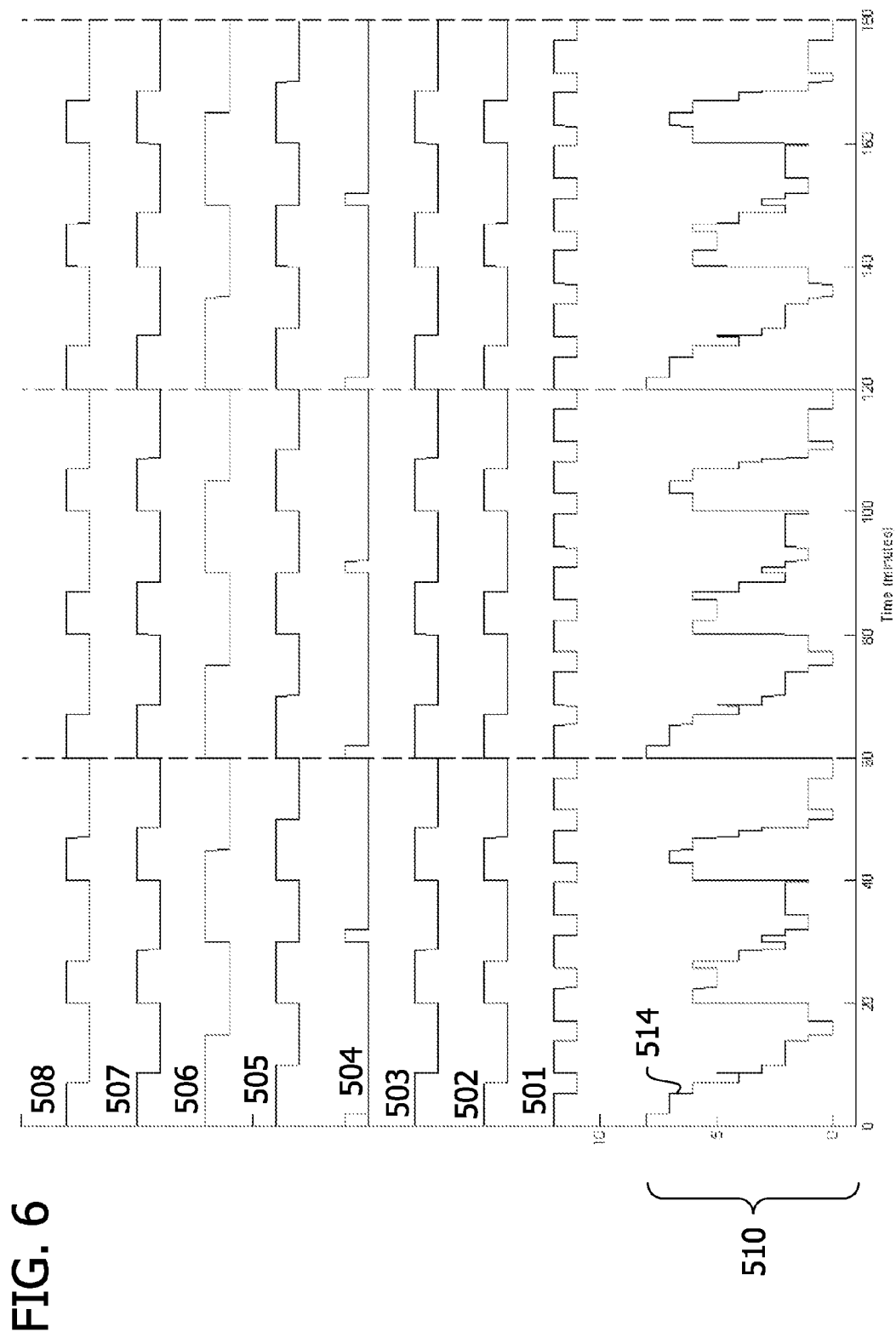
FIG. 6 is a waveform diagram of eight interval cycle patterns illustrating the aggregate interval cycle pattern showing the false peak windows of opportunity in the aggregate pattern with time along the x-axis and number of loads operating (i.e., ON) along the y-axis.

As shown in FIG. 6, eight different interval cycle patterns 501-508 are illustrated for eight different pieces of equipment having different operating profiles. The aggregate interval cycle pattern 514 may vary in a range 510 from 0 devices beginning to operate their loads to 8 devices operating their loads. If we define a false peak window of opportunity as 7 or 8 devices operating simultaneously, there are five (5) different cyclical false peaks illustrated by the aggregate interval cycle pattern of FIG. 6, two at the start of the intervals (the second and third interval) and three toward the end of the interval. The initial "peak" at the start of the first interval is not considered a false peak as just prior to the LC event beginning, all the loads were allowed to be on, thus the loads continuing to be on is not a peak, rather a ramp-in to load control where the shedding is not immediate but instead gradual.

In contrast, FIG. 7 shows the eight interval cycle patterns 501-508 of FIG. 6 revised to have different interval start times (i.e., different subinterval shifts). There are zero (0) different false peaks (e.g., 7 or 8 devices operating at once) illustrated by the aggregate interval cycle pattern 515 of FIG. 7 which only varies from 0 to 6 devices operating at once. This indicates that the different subinterval shifts reduce cyclical false peak windows of opportunity. FIG. 8 is a comparison of the aggregate waveforms 514 and 515 of FIGS. 6 and 7 showing that the number of loads that could be operating at an interval boundary is reduced.

Figure 9:
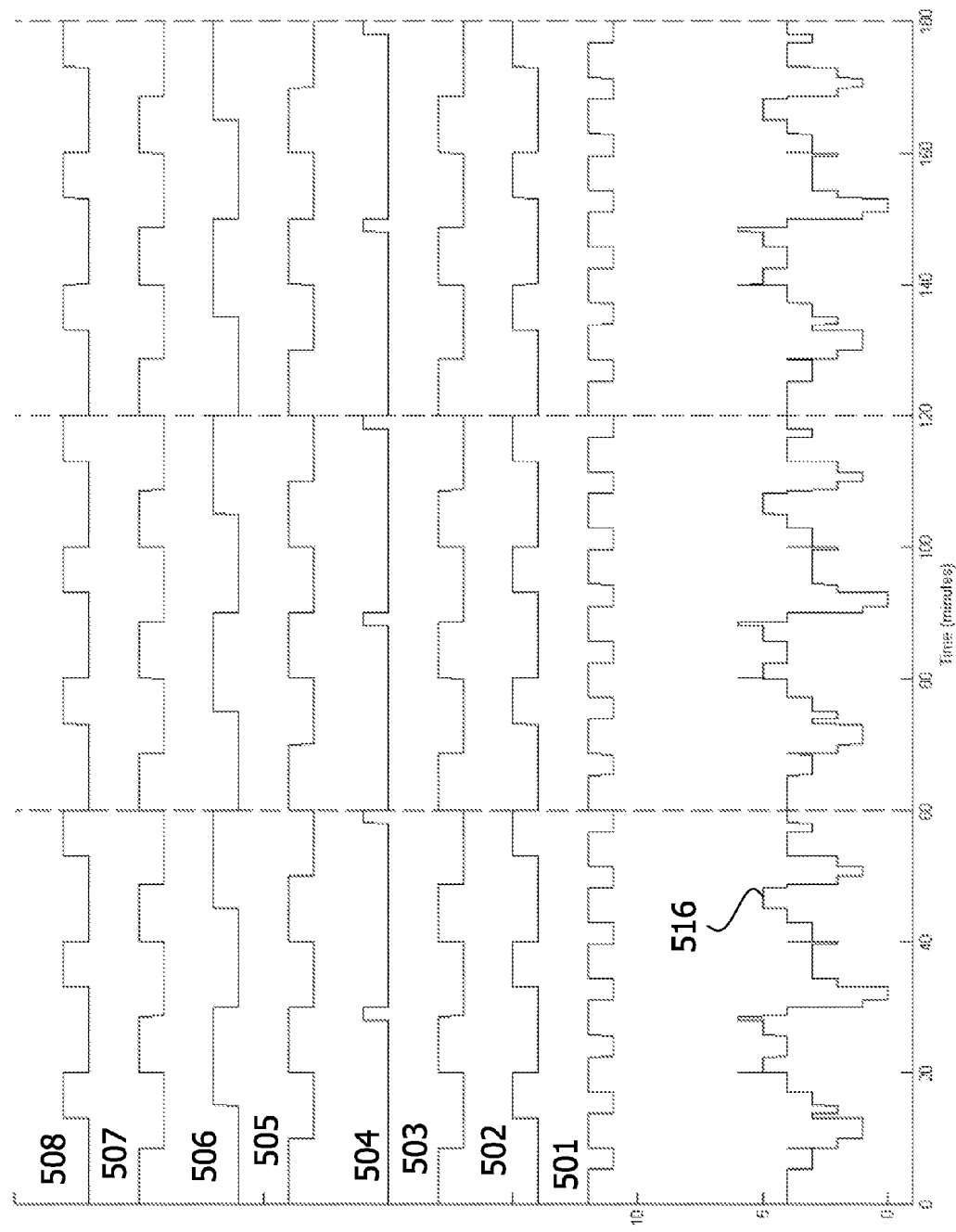
FIG. 9 is a waveform diagram of the eight interval cycle patterns of FIG. 6 in which some have been revised to have their order of cycling changed showing the false peak windows of opportunity in the revised aggregate pattern with time along the x-axis and number of loads operating (i.e., ON) along the y-axis.
Figure 10:
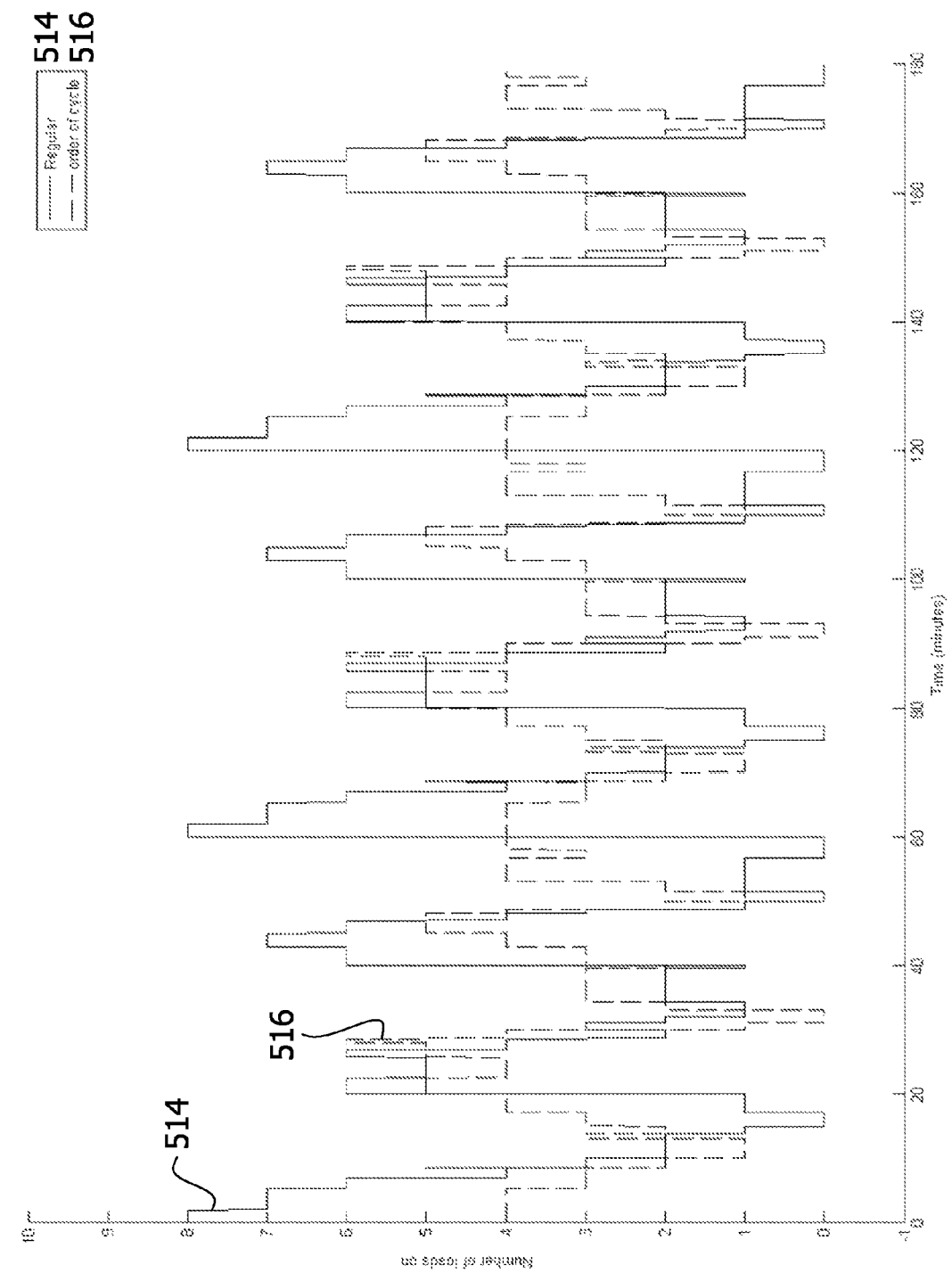
FIG. 10 is an overlay comparison of the aggregate interval cycle pattern of FIG. 6 and the revised aggregate pattern of FIG. 9 showing the reduction in the false peaks with time along the x-axis and number of loads operating (i.e., ON) along the y-axis.

Order of Cycling (FIGS. 9 and 10)

Another embodiment of the invention involves the order of cycling the load. Once a load control event begins, and the load is cycled according to the usage profile, the cycle pattern can be calculated to begin either ON first then OFF or OFF first then ON. According to this embodiment, half the devices are configured to begin an ON cycle at an interval boundary and half the devices are configured to being an OFF cycle at an interval boundary. As a result, only half the devices in many scenarios will begin operation at the beginning of an interval boundary. With the order of cycling done in this fashion, the potential for cyclical false peaks occurring at the start of the interval is reduced because only half the loads are allowed to begin operating. By again grouping the devices, this time into two groups where one group cycles ON then OFF and the other cycles OFF first then ON, the opportunity for cyclical false peaking based on the formation of the load control pattern is reduced by 50% assuming the grouping to be uniform.

FIG. 9 illustrates one example of revising the interval cycle patterns 501-508 of FIG. 6 so that half of the waveforms begin at ON and half begin at OFF. The aggregate interval cycle pattern 516 varies from 0 to 6 devices operating their loads simultaneously. Thus, there are zero (0) different false peaks (e.g., 7 or 8 devices operating at once) illustrated by the aggregate interval cycle pattern 516. FIG. 10 is a comparison of the aggregate waveform 514 of FIG. 6 and the aggregate waveform 516 of FIG. 9 showing that the number of loads that could be operating at an interval boundary is reduced.

Figure 11:
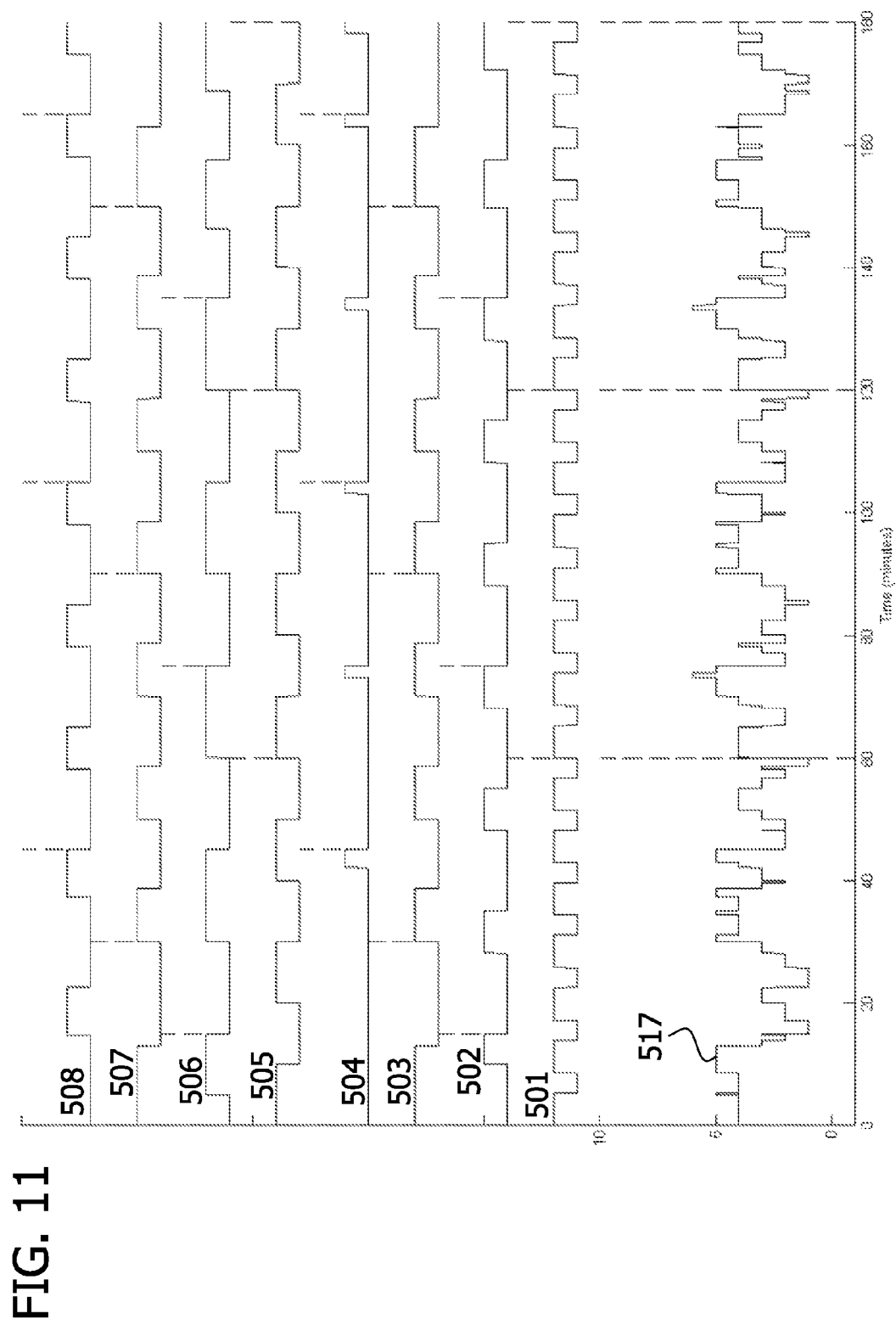
FIG. 11 is a waveform diagram of the eight interval cycle patterns of FIG. 6 in which some have been revised to have different interval start times and to have their order of cycling changed showing the false peak windows of opportunity in the revised aggregate pattern with time along the x-axis and number of loads operating (i.e., ON) along the y-axis.
Figure 12:
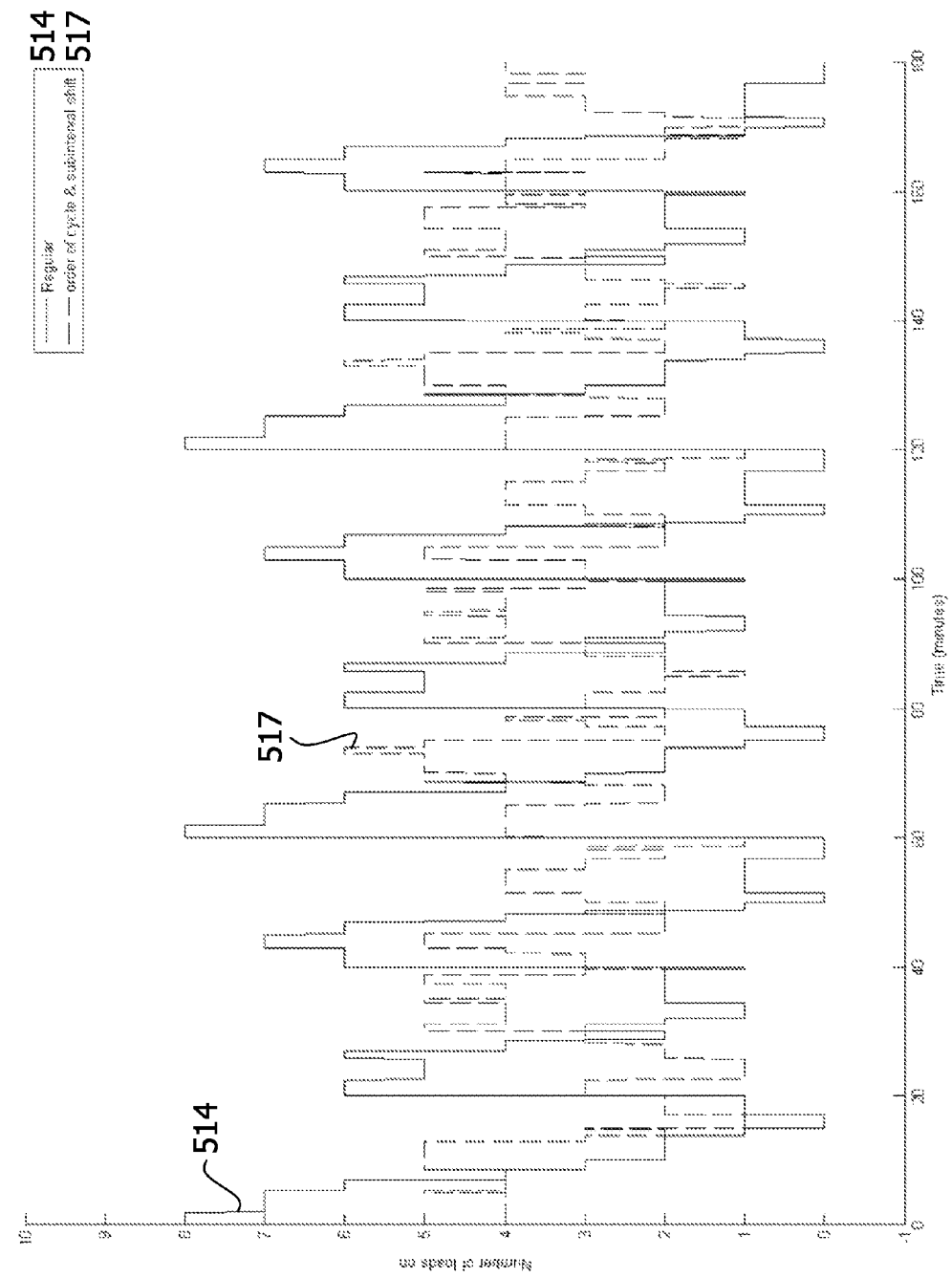
FIG. 12 is an overlay comparison of the aggregate interval cycle pattern of FIG. 6 and the revised aggregate pattern of FIG. 11 showing the reduction in the false peaks with time along the x-axis and number of loads operating (i.e., ON) along the y-axis.

Subinterval Grouping and Cycling Order Combined (FIGS. 11 and 12)

The above two embodiments may be used in conjunction to achieve a reduction in the likelihood of cyclical false peaking by a factor of twice the number of subintervals that comprise an interval (e.g., by a factor of eight when four subintervals comprise an interval) when the formation of device groups is uniform over both dimensions. For example, if an hour long interval was composed of six ten minute subintervals, then the reduction factor would be twelve.

FIG. 11 illustrates one example of revising the interval cycle patterns of FIG. 6 to vary subinterval grouping and to force half of the waveforms to begin at ON and half to begin at OFF. The aggregate interval cycle pattern 517 varies from 1 to 6 devices operating their loads simultaneously. Thus, there are zero (0) different false peaks (e.g., 7 or 8 devices operating at once) illustrated by the aggregate interval cycle pattern 517. FIG. 12 is a comparison of the aggregate waveform 514 of FIG. 6 and the aggregate waveform 517 of FIG. 11 showing that the number of loads that could be operating at an interval boundary is reduced.

Figure 13:
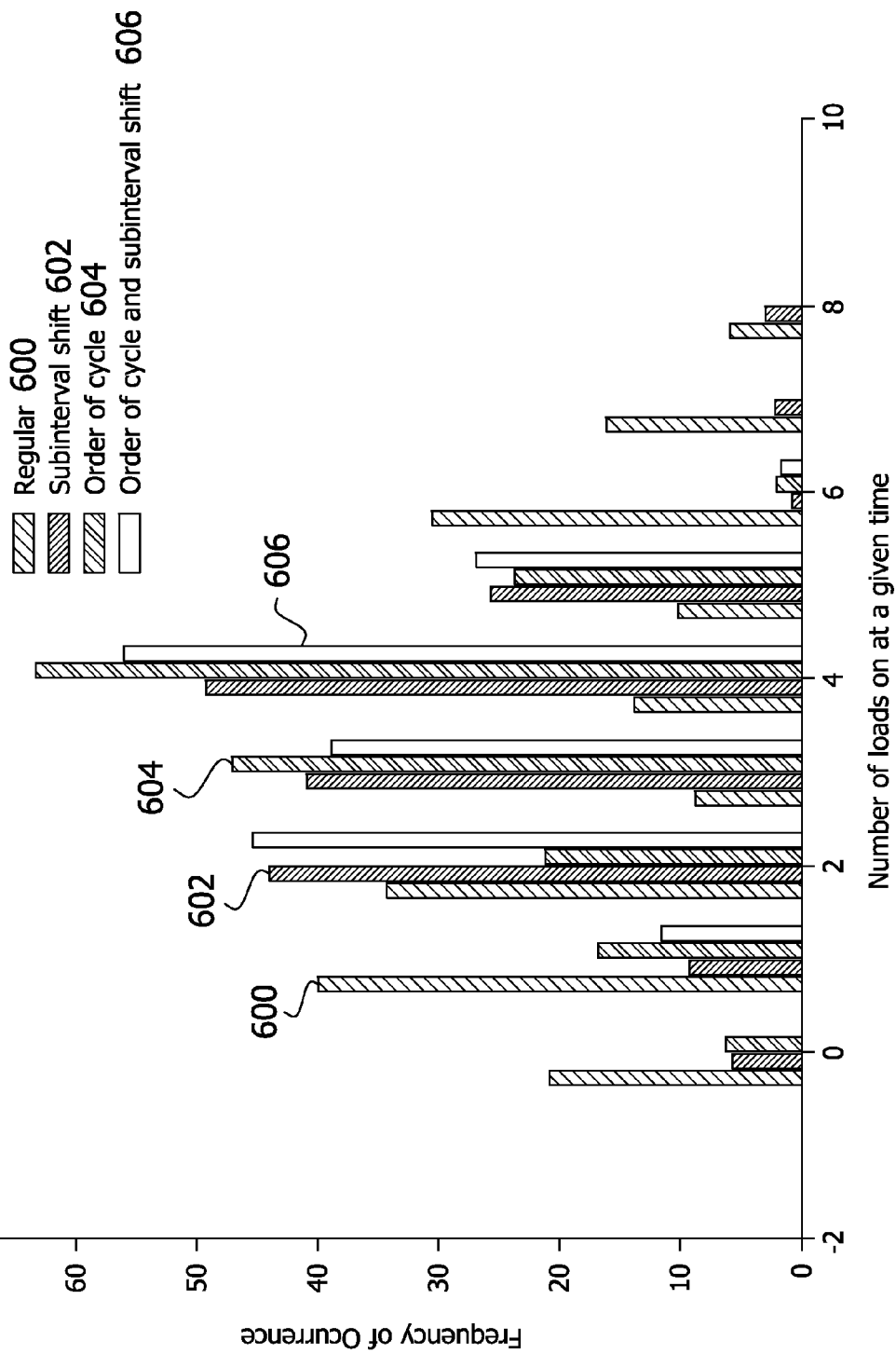
FIG. 13 is a bar graph of the frequency of occurrence of the number of loads ON at a given time for the aggregate interval cycle pattern of FIG. 6 and for the revised aggregate patterns of FIGS. 7, 9 and 11, with the number of loads operating (i.e., ON) at any given time along the x-axis and the frequency of occurrence along the y-axis.

Summary (FIG. 13)

FIG. 13 is a bar graph of the frequency of occurrence of the number of loads ON at a given time for the aggregate interval cycle pattern 514 of FIG. 6 and for the revised aggregate patterns 515-517 of FIGS. 7, 9 and 11, respectively, showing the number of loads operating (i.e., ON) at any given time along the x-axis and the frequency of occurrence along the y-axis.

FIG. 13 illustrates the comparison of the option of regular load control 600 according to the prior art, and the features noted above regarding subinterval shift 602, order of cycle control 604 and both subinterval shift and order of cycle control 606. Given these different options, FIG. 13 shows that the number of devices that are ON at any given time is less distributed and begins to bunch around the 50% mark. In a scenario with many more units (e.g., an x-axis ranging from zero to a few thousand), the bar plot starts to look like a Gaussian distribution curve (mean near 50%) and the features noted above regarding subinterval shift, order of cycle and both subinterval shift and order cycle are in effect reducing the variance of the spread.

Figure 5:
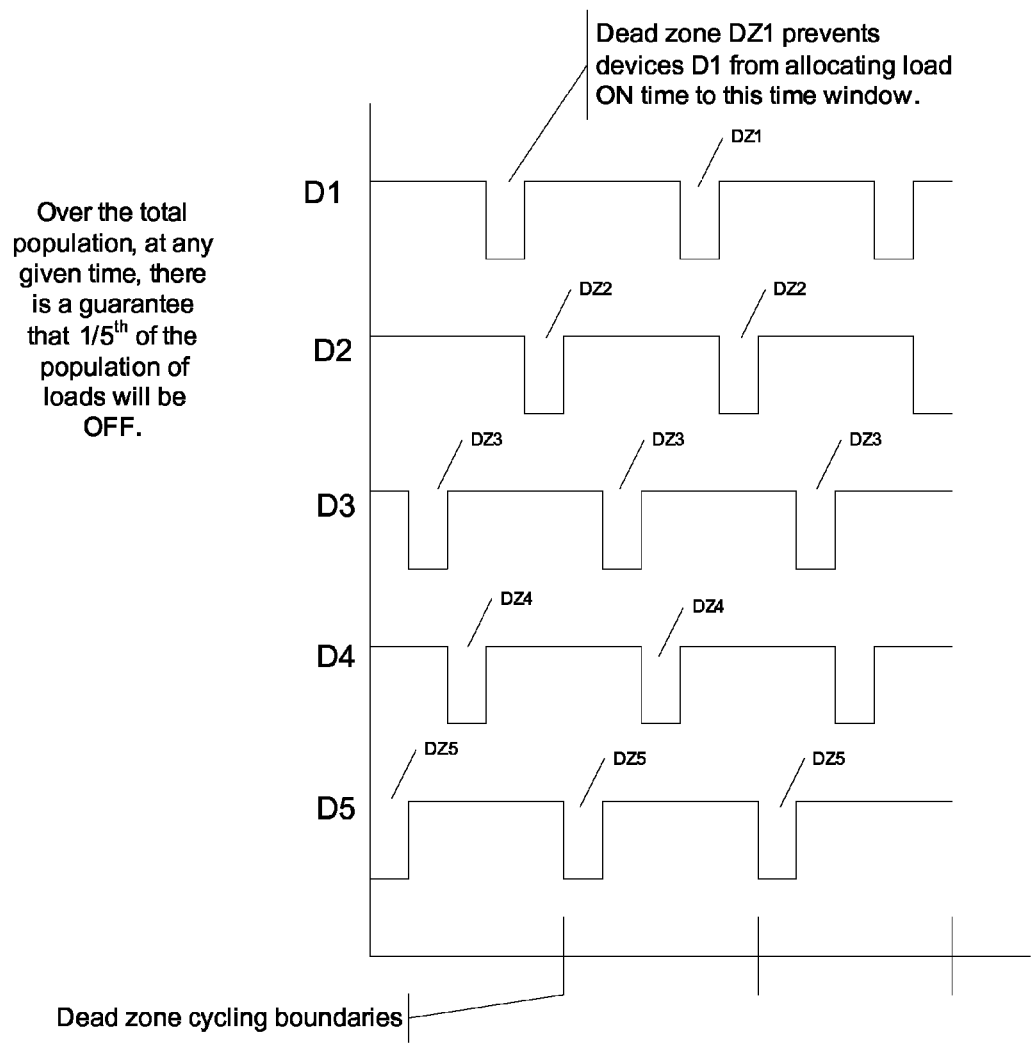
FIG. 5 illustrates the allotment of dead zones for five different groups of pieces of equipment.

Overview of Dead Zone (FIG. 5)

A third embodiment of the invention allows for a percentage of the total number of devices to have their loads forced OFF at a given time by grouping devices into a number of groups (e.g., 5) wherein each group is assigned a specific, unique time window during which their loads must be OFF. This 'dead zone' is used in the calculation of how to distribute the allowed ON time during the creation of the load control pattern. The amount of devices allowed to run their respective loads is capped based on how many time windows are used in the formation of the dead zones. For example, if five time windows are used in an hour interval, then each dead zone will total 12 minutes. During that time only 80% of the devices will be allowed to run, assuming the dead zones do not overlap. Note that the dead zone for a single group need not be contiguous, as it may be broken up into several periods of time.

Referring to FIG. 5, an illustration is presented in a timing diagram of five groups of devices D1, D2, D3, D4 and D5, each having a different dead zone (DZ) between the dead zone cycling boundaries. Group D1 is assigned a dead zone (DZ1) between 60% and 80% of the dead zone cycling boundaries. Group D2 is assigned a dead zone (DZ2) between 80% and 100% of the dead zone cycling boundaries. Group D3 is assigned a dead zone (DZ3) between 20% and 40% of the dead zone cycling boundaries. Group D4 is assigned a dead zone (DZ4) between 40% and 60% of the dead zone cycling boundaries. Group D5 is assigned a dead zone (DZ5) between 0% and 20% of the dead zone cycling boundaries.

One possible consequence of dead zones is that variability in load control patterns could be reduced as many devices share at least two relay transitions in common (shedding to enter the dead zone and restoring to exit the dead zone). On the other hand, the dead zone embodiment of the invention is insulated against variations in load usage profiles as it forces a known load state during a certain time regardless of the amount of dispatchable load to be distributed throughout the load control interval. This dead zone embodiment may be implemented as a variation of the OFF time portion of a method or apparatus which allows a specific duty cycle to be set based on command parameters. Depending on the groupings of method or apparatus, the aggregate response can provide known periods of OFF time where a certain percentage of loads are maintained in an OFF state.

The groupings for each of the above embodiments, the interval start time, the order of cycling and/or the dead zone timing may be determined by the lower four bits of the device serial number. For example, in order to determine a device's starting interval, its cycling order and its dead zone interval, the sixteen values of the lower four bits of the device serial number are divided into four groups with two odd and two even values for each group. This deterministic method provides a cyclical false peaking reduction factor of eight and keeps the groupings uniformly spread throughout the population. However, there exist many other methods for which to choose a device's grouping either deterministically or randomly. The factor of eight reduction is achieved for the cyclical peaks by the interval start and order of cycling. In contrast, the dead zones provide an overall cap to the usage and eliminate cyclical and non-cyclical false peaks determined by the number of dead zone groups.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of data and/or computer-executable instructions, such as program modules, stored one or more tangible computer storage media and executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computers and/or servers may execute the computer-executable instructions such as those illustrated herein to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules on a tangible computer readable storage medium. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A load control apparatus for use with an electrical distribution system by which a utility supplies electricity to one or more pieces of equipment at a plurality of utility's customer's location, each piece of equipment placing an electrical load on the system when it is operating, said load control apparatus for connection to the pieces of equipment for controlling the shedding of electrical load placed on the system by the respective pieces of equipment, said load control apparatus comprising:

a power sensor for connection to a piece of equipment and sensing when electricity is being supplied to the piece of equipment;

a load control logic device responsive to inputs from the sensor for determining a usage profile indicative of the electricity usage of the piece of equipment, said usage profile being characterized over successive periods of time comprising a total characterization; and a load control switch for shutting OFF electricity to the piece of equipment, said load control switch controlled by the load control logic device;

wherein, during occurrence of a load control event in which load on the system must be shed, at least one of the following:

the load control logic device controls the switch to shed load as a function of the usage profile and as a function of a predefined subinterval for defining the beginning of the predetermined interval thereby providing for diversification in the aggregate load control behavior of the apparatus as compared to other apparatus having a different predefined subinterval for defining the beginning of the predetermined interval;

the load control logic device controls the switch to shed the load as a function of the usage profile and as a function of the order of the switch cycling; and the load control logic device controls the switch to shed load as a function of the usage profile and as a function of at least one predefined period of time during which the load control switch shuts OFF electricity to the piece of equipment thereby allowing for reduction in potential peaking of loads, cyclical or non-cyclical, during the load control event, so that the shedding is insulated from changes in the load usage profile of the piece of equipment, and so that other pieces of equipment having at least one different predefined period of time for shutting OFF electricity would start shedding their loads at the at least one different period of time.

2. The apparatus of claim 1 wherein the load control logic controls the switch to shed the load as a function of the usage profile and as a function of the predefined subinterval for defining the beginning of the predetermined interval.

3. The apparatus of claim 1 wherein the load control logic controls the switch to shed the load as a function of the usage profile and as a function of the order of the switch cycling.

4. The apparatus of claim 1 wherein the load control logic controls the switch to shed the load as a function of the usage profile and as a function of the at least one predefined period of time during which the load control switch shuts OFF electricity the piece of equipment.

5. The apparatus of claim 1 wherein the load control logic controls the switch to shed the load as a function of the usage profile, as a function of the predefined subinterval for defining the beginning of the predetermined interval, and as a function of the order of the switch cycling.

6. The apparatus of claim 1 wherein the load control logic controls the switch to shed the load as a function of the usage profile, as a function of the predefined subinterval for defining the beginning of the predetermined interval and as a function of the at least one predefined period of time during which the load control switch shuts OFF electricity the piece of equipment.

7. The apparatus of claim 1 wherein the load control logic controls the switch to shed the load as a function of the usage profile, as a function of the order of the switch cycling and as a function of the at least one predefined period of time during which the load control switch shuts OFF electricity to the piece of equipment.

8. The apparatus of claim 1 wherein the load control logic controls the switch to shed the load as a function of the usage profile, as a function of the predefined subinterval for defining the beginning of the predetermined interval, as a function of the order of the switch cycling and as a function of the at least one predefined period of time during which the load control switch shuts OFF electricity the piece of equipment.

9. The apparatus of claim 2 wherein the predefined subinterval is defined by at least one of a number associated with the apparatus and a random number.

10. The apparatus of claim 2 wherein the predefined subinterval is defined by a serial number of the apparatus.

11. The apparatus of claim 3 wherein said load control logic determines whether to begin allowing load or begin shedding load at the start of the load control interval as a function of the actual sensed usage just prior to the start time.

12. The apparatus of claim 3 wherein the order of cycling is defined by at least one of a number associated with the apparatus and a random number.

13. The apparatus of claim 3 wherein the order of cycling is defined by a serial number of the apparatus.

14. The apparatus of claim 4 wherein the at least one predefined period is defined by a number associated with the apparatus.

15. The apparatus of claim 4 wherein the at least one predefined period is defined by a serial number of the apparatus.

16. A method executed by logic or a processor, said method for use with an electrical distribution system by which a utility supplies electricity to one or more pieces of equipment at a plurality of utility's customer's locations, each piece of equipment placing an electrical load on the system when it is operating, said method for controlling the shedding of electrical load placed on the system by the respective pieces of equipment, said method comprising:

sensing when electricity is being supplied to the piece of equipment;

determining a usage profile indicative of the electricity usage of the piece of equipment, said usage profile being characterized over successive periods of time comprising the total characterization; and selectively shutting OFF electricity to the piece of equipment during occurrence of a load control event in which load on the system must be shed, in accordance with at least one of the following:

shedding the load as a function of the usage profile and as a function of a predefined subinterval for defining the beginning of the predetermined interval thereby providing for diversification in the aggregate load control behavior of the apparatus as compared to other apparatus having a different predefined subinterval for defining the beginning of the predetermined interval;

shedding the load as a function of the usage profile and as a function of the order of the switch cycling; and shedding the load as a function of the usage profile and as a function of at least one predefined period of time during which the load control switch shuts OFF electricity the piece of equipment thereby allowing for reduction in potential peaking of loads, cyclical or non-cyclical, during the load control event, so that the shedding is insulated from changes in the load usage profile of the piece of equipment, and so that other pieces of equipment having at least one different predefined period of time for shutting off electricity would start shedding their loads at the at least one different period of time.

17. The method of claim 16 wherein shedding the load comprises shedding the load as a function of the usage profile and as a function of the predefined subinterval for defining the beginning of the predetermined interval.

18. The method of claim 16 wherein shedding the load comprises shedding the load as a function of the usage profile and as a function of the order of the switch cycling.

19. The method of claim 16 wherein shedding the load comprises shedding the load as a function of the usage profile and as a function of the at least one predefined period of time during which the load control switch shuts OFF electricity the piece of equipment.

20. A system of a plurality of load control apparatus for use with an electrical distribution system by which a utility supplies electricity to one or more pieces of equipment at a plurality of utility's customer's locations, each piece of equipment placing an electrical load on the system when it is operating, said load control apparatus for connection to the pieces of equipment for controlling the shedding of electrical load placed on the system by the respective pieces of equipment, each said load control apparatus comprising:

a power sensor for connection to a piece of equipment and sensing when electricity is being supplied to the piece of equipment;

a load control logic device responsive to inputs from the sensor for determining a usage profile indicative of the electricity usage of the piece of equipment, said usage profile being characterized over successive periods of time comprising the total characterization; and a load control switch for shutting OFF electricity to the piece of equipment, said load control switch controlled by the load control logic device;

wherein, during occurrence of a load control event in which load on the system must be shed, at least one of the following:

the load control logic device controls the switch to shed load as a function of the usage profile and as a function of at least one predefined subinterval used to determine the beginning of the predetermined interval and/or cycling order to minimize cyclical peaks in an aggregation of the apparatus of the system; and the load control logic device controls the switch to shed load as a function of the usage profile and as a function of at least one predefined period of time during which the load control switch shuts OFF electricity to the piece of equipment to eliminate cyclical and non-cyclical peaks in an aggregation of the apparatus of the system.

* * * * *